United States Patent [19]

Grall

[11] Patent Number: 4,794,574

[45] Date of Patent: Dec. 27, 1988

[54] BROAD BAND INTERFERENCE SONAR HAVING COMPRESSED EMISSION

[75] Inventor: Georges Grall, Le Conquet, France

[73] Assignee: Thomson-CSF, Paris, France

[21] Appl. No.: 808,652

[22] Filed: Oct. 29, 1985

[30] Foreign Application Priority Data

Oct. 30, 1984 [FR] France .................. 84 16595

[51] Int. Cl.$^4$ .................. G01S 15/02; H04R 1/32
[52] U.S. Cl. .................. 367/87; 367/905; 367/154
[58] Field of Search .................. 367/87, 101, 154, 905

[56] References Cited

U.S. PATENT DOCUMENTS

| | | |
|---|---|---|
| 4,234,939 | 11/1980 | Grall .................. 367/87 |
| 4,510,586 | 4/1985 | Grall et al. .................. 367/87 |

*Primary Examiner*—Thomas H. Tarcza
*Assistant Examiner*—Daniel T. Pihulic
*Attorney, Agent, or Firm*—Cushman, Darby & Cushman

[57] ABSTRACT

A system of emission array with several pairs of emitting transducers to emit simultaneously and covering contiguous frequency sub-bands of a band B. The sub-bands have a width which is less than or at most equal to the width inducing an acceptable displacement of the directivity lobes of the emission pattern of a pair of arrays. The emitters of a single pair are spaced by a distance of $L_i$ and emit signal pulses at frequency $f_i$ and of duration $\tau_e 1/\Delta f$, the products $L_i f_i$ being equal for all the pairs of emitters.

The emission patterns of the various pairs of emitters accordingly coincide precisely, and, as the emitters are supplied with signals emerging from the oscillators which are in phase at the center of the pulse of duration $\tau_e$, the pulse resulting from the superposition of the emitted signals is compressed in time.

8 Claims, 3 Drawing Sheets

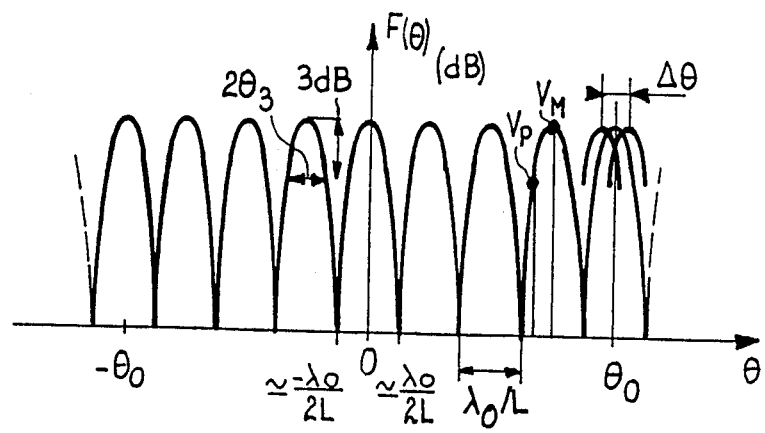
FIG_1
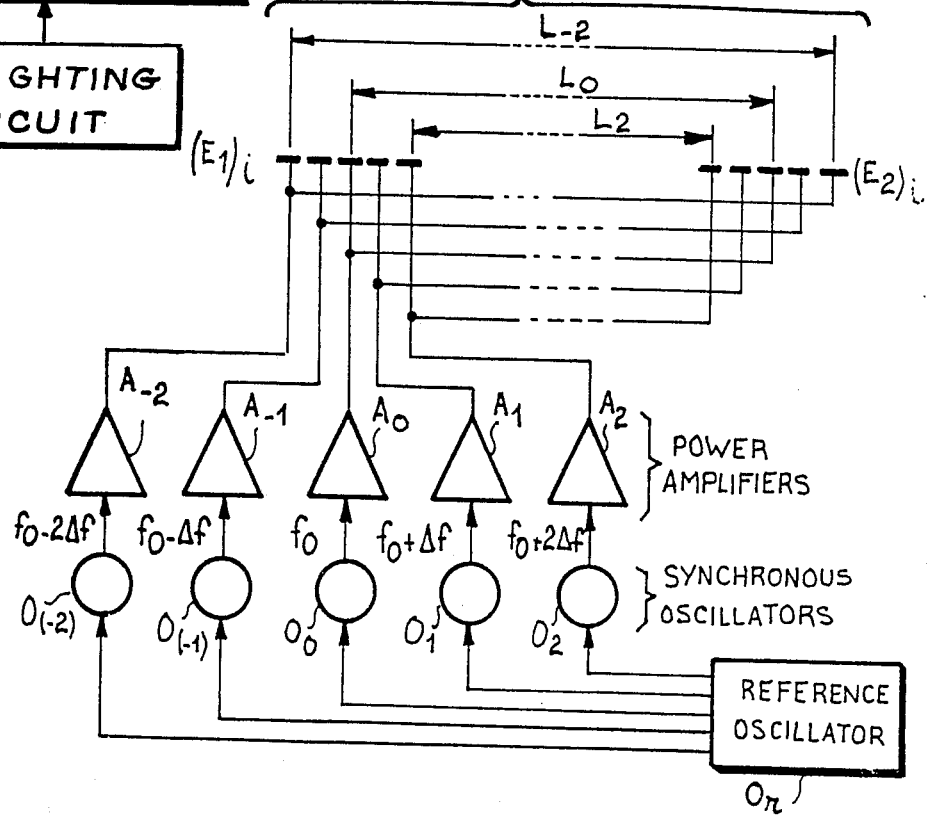
FIG_2

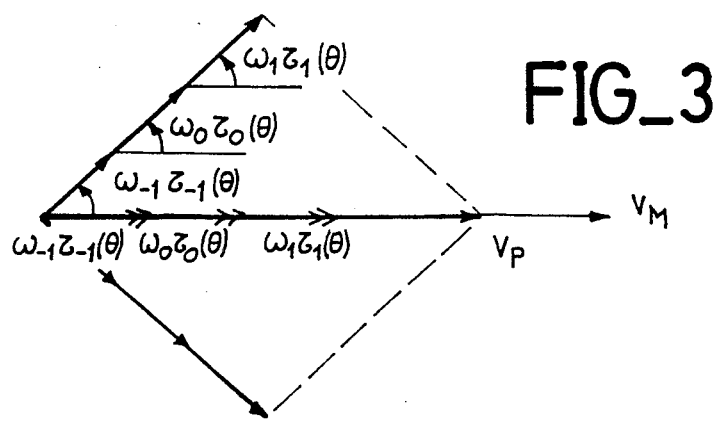
FIG_3
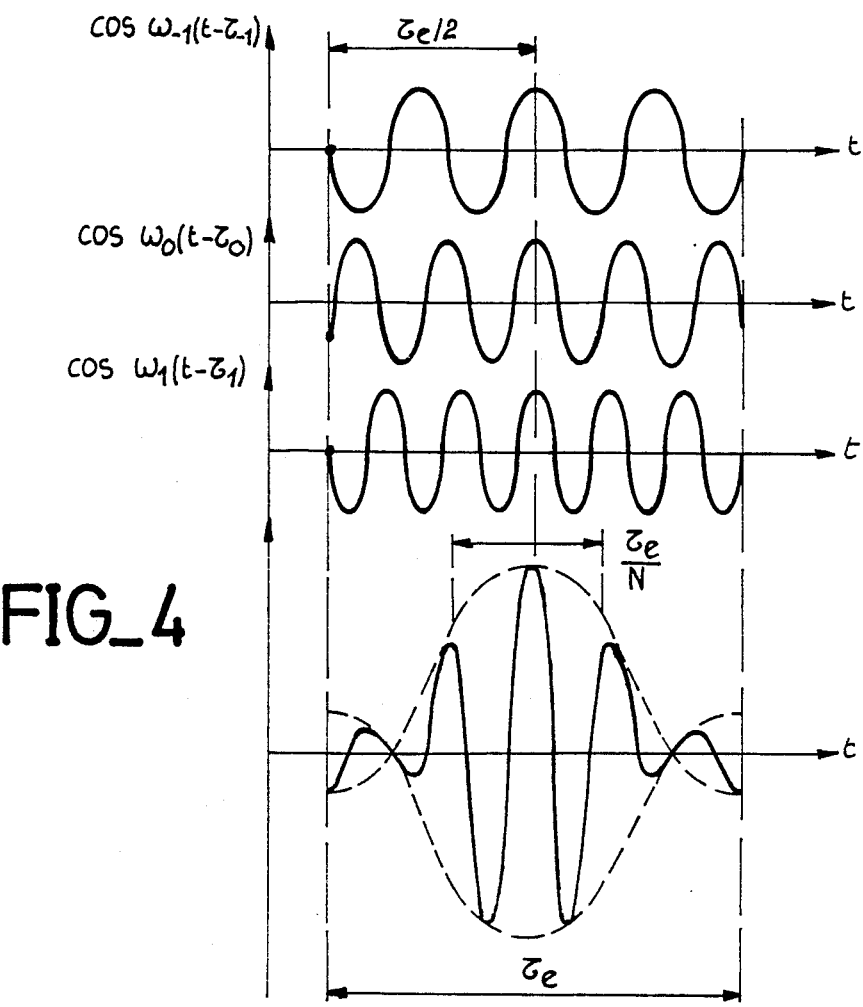
FIG_4

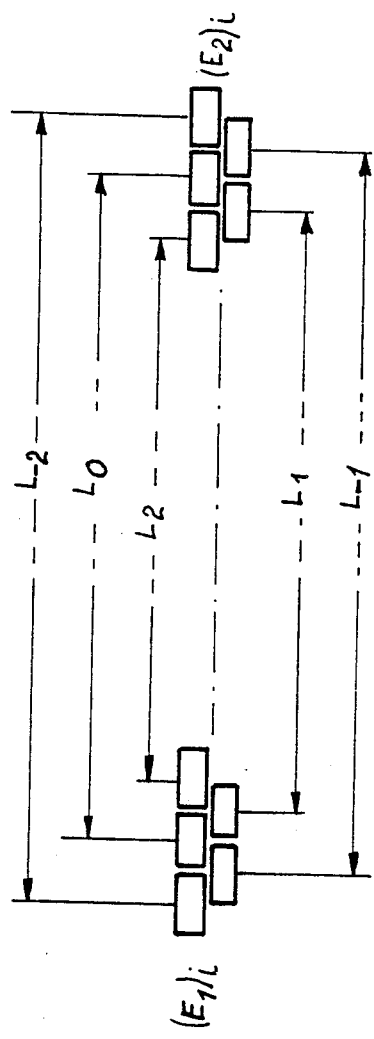
FIG_5

BROAD BAND INTERFERENCE SONAR HAVING COMPRESSED EMISSION

BACKGROUND OF THE INVENTION

The invention relates to an interference sonar, that is to say a sonar in which the emission is effected by means of two emitters emitting simultaneously and separated by a length L equal to the maximum length available for the sonar transducer array. By means of interferometry, these emitters generate a multiple beam, the ambiguity of which is eliminated at the reception stage.

An antenna system for an interference sonar of this type has been described in the U.S. Pat. No. 4,234,939 and entitled "Array system having a high resolving power". The emission antenna comprises at least two emission transducers which emit in synchronism and which are placed at the extremities of the reception array. The emission radiation pattern, the amplitude of which varies as a function of the direction $\theta$ in accordance with $F(\theta)$:

$$F(\theta) = \cos\left(\frac{\pi L}{c} f_o \sin\theta\right), \quad (1)$$

then exhibits in its angular field a succession of maxima and minima at an interval p such that:

$$\frac{\pi L}{\lambda_o} \sin p = \pi, \text{ i.e. } p \text{ is close to } \frac{\lambda_o}{L} \quad (2)$$

In these formulae, $\theta$ is the angle formed by one direction of observation with an axis orthogonal to the line formed by the antennas, c is the velocity of the sound waves in water, $f_o$ is the emission frequency, and $\lambda_o = c/f_o$ is the wavelength of vibration in the radiation medium, i.e. water. The width of the lobes thus obtained by interferometry is approximately one-half of that obtained with an emission base covering the whole of the length L, which improves the resolving power.

It is possible to receive simultaneously in the directions of the emission maxima by predetermining as many reception channels as there are lobes, based on a full reception array which is however composed of a plurality of sources between which a phase displacement is introduced, in such a manner as to cause the maxima of the reception channels to coincide with the emission maxima. In order to cover all the directions of the angular field, provision is made for the creation of further maxima in the emission radiation pattern, coinciding with the minima of the first, and a second series of predetermined reception channels, making use of the same emission and reception sources, either by means of two sequential emissions exhibiting a phase displacement at the same frequency or by means of two simultaneous emissions at different frequencies.

The emissions are acoustic signal pulses of wavelength $\lambda_o$, which are recurring and which have a duration $\tau_e$. A frequency band $\Delta f = 1/\tau e$ corresponds to this duration. Consequently, corresponding to each frequency included in the band $\Delta f$ about the frequency $f_o$ there is a pattern $F(\theta)$ of the cosine form in accordance with the formula (1) hereinabove, in such a manner that the resulting pattern is not correctly implemented, since there are no well defined maxima or zeros, except for the central maximum.

In fact, the directions of the maxima of the emission pattern which are given by $F(\theta) = 1$ are such that $F_o \sin\theta = 2c/L$ k, where k is an integer. Consequently, when the frequency varies within the frequency band $\Delta f$ the direction of the maxima likewise varies in the following manner:

$$\frac{df}{f_o} = -\frac{d\theta}{\tan\theta}.$$

When the frequency of emission $F_o$ undergoes a variation of df, the variation $d\theta$ corresponding to the direction $\theta$ has the value of $|d\theta| = df/f_o \cdot \tan\theta$. In order that the interference pattern should not be degraded to too great an extent, it is necessary to restrict the value of the frequency band, and this demands in the system described hereinabove a minimum duration for the acoustic pulse. It is accepted that $d\theta$ can reach a maximum of one-fourth of the width of the lobes of the radiation pattern at half power, that is to say at 3 dB attenuation of maximum; this width at half-power is $2\theta_3 \simeq c/2f_o L = \lambda_o/2L$ i.e. $d\theta \leq \pm\theta_3/2$. The variation is a maximum for the limits of the angular field, i.e. $-\theta_o$ and $+\theta_o$.

For these directions, $$df = \frac{\theta_3}{2} \cdot \frac{f_o}{\tan\theta_o} = \frac{c}{8L\tan\theta_o}, \text{ i.e. } \Delta f_{max} = 2df = \frac{c}{4L tg\theta_o}$$

The duration $\tau_e$ of the pulse cannot therefore be less than $1/\Delta f_{max}$ in order that the pattern should not be degraded to too great an extent.

This restriction presents a twofold difficulty:

In the case of a given angular field, it restricts the resolution in terms of distance, $c/2\Delta f$, since the pulses are too long;

In the case of a given resolution in terms of distance, it restricts the angular field covered.

By way of example, for $L = 250\lambda_o$, a fixed angular field $2\theta_o = 30°$, and a frequency of emission $F_o = 200$ KHz, $\Delta f_{max}$ is equal to 750 Hz. Now, in order to obtain a range $D = 100$ meters, i.e. a lateral resolution in terms of distance $2\theta_3 D$ equal to 0.2 m, a band of 750 Hz is not sufficient. A band at least equal to 3.75 KHz would be required.

The subject of the invention is an interference sonar which does not present the abovementioned difficulties and which more especially is a broad band interference sonar. The particular structure of the system of the sonar according to the invention also permits compressed emission to be achieved.

SUMMARY OF THE INVENTION

According to the invention, a broad band interference sonar exhibiting compressed emission and comprising an emission system having two spaced emitters associated with emission control circuits and a reception system associated with reception circuits is characterized in that each emitter is constituted by a group of N pairs of elementary emitters, $(E_1)_i$ and $(E_2)_i$, i being an integer between $-(N-1)/2$ and $(N-1)/2$ for odd N and i being between $-N/2$ and $+N/2$ and different from 0 for even N, one elementary emitter $(E_1)_i$ being spaced from the corresponding elementary emitter $(E_2)_i$ by a length $L_i$, these two elementary emitters being supplied with a common signal of frequency $f_i$, in that the products $L_i f_i$ of the N pairs of elementary emitters defined in this manner are equal, and in that all the emitters are supplied simultaneously, during the recurring pulses, with signals of frequencies $f_i$ in phase at the center of the pulses.

The invention will be better understood, and further characteristics will become evident, with the aid of the following description which is given with reference to the accompanying figures.

BRIEF DESCRIPTION OF THE DRAWINGS

FIG. 1 shows the radiation pattern $F(\theta)$ in dB of an interference, array comprising two emitting transducers, according to the state of the art.

FIG. 2 shows the interference emission array of the sonar according to the invention and the associated control means.

FIGS. 3 and 4 are diagrams which explain the operation of the sonar according to the invention.

FIG. 5 shows another example of emission array for a sonar according to the invention.

The interference sonar according to the invention is such that the emission radiation pattern is not disturbed when the sonar covers a band of frequency B. This band B is larger than the frequency band within which it is possible to consider, in the known system which is briefly described hereinabove, that the interference pattern is not degraded to an excessively large extent.

According to formula (1), which gives the expression for the amplitude coefficient of the radiation pattern, $F(\theta)$, shown in FIG. 1, one solution for obtaining a pattern $F(\theta)$ which is not disturbed by the variations in frequency within the band B is that, for each frequency f, the product Lf is constant, i.e. $Lf = K$, where K is a constant.

However, in a frequency band $\Delta f \leq \Delta f_{max}$, given by the relationship (3), the emission pattern $F(\theta)$ is considered as undisturbed. It is accordingly possible to envisage a discrete set of distances, $L_i$, that is to say several pairs of emitters, each pair corresponding to a frequency of emission $f_i$ about which a frequency band $\Delta f$ less than or equal to the maximum value $\Delta f_{max}$ makes maintenance of the independence of $F(\theta)$ in relation to the frequency. The emission frequencies associated with each one of the pairs of emitters are $\Delta f$ apart, and the band B can thus be covered with a number N of pairs of emitters, N being the higher interjer corresponding to the quotient $B/\Delta f$. The central frequency of the band B, namely $f_0$, corresponds to the emission frequency of the central pair if N is an odd number. On the other hand, if N is an even number the emission frequencies of the two central pairs are $f_o - \Delta f/2$ and $f_o + \Delta f/2$.

Accordingly, the emitters $E_1$ and $E_2$ of the system according to the prior art are each replaced by a series of N emitters thus forming N pairs of emitters. The two emitters of each one of the N pairs are denoted by subscripts i, such that for odd N, i is an integer such that: $-(N-1)/2 \leq i \leq +(N-1)/2$ for even N, i is an integer such that $-N/2 - i < +N/2$ and i is different from 0.

The corresponding emission frequencies are
$f_i = f_o = i\Delta f$, for odd N
$f_i = f_o + (\text{sign } i)(2|i| - 1/2\Delta f)$, for even N.

The distances between emitters of a pair denoted by subscript i are:

$$L_i = \frac{K}{f_i}$$

FIG. 2 shows schematically the emission circuits, and the associated array system, of the interference sonar according to the invention in an embodiment in which N=5. Each emitter $E_1$, $E_2$ comprises N elementary emitters $(E_1)_i$ and $(E_2)_i$; the elementary emitters forming the pair denoted by subscript i are separated by a distance of $L_i$ and are supplied with signal pulses at the frequency $f_i$, which are recurring and which have a duration of $\tau_e = 1/\Delta f$. The emission circuits comprise N power amplifiers $A_i$, that is to say $A_{-2}$, $A_{-1}$, $A_o$, $A_1$ and $A_2$, which receive signals from N oscillators $0_i$, i=-2 to +2 at the frequencies $f_i$. These oscillators $0i$, which are in phase at the center of the pulse $\tau_e$, receive sychronizing signals from a reference oscillator $0_r$. The output of an amplifier $A_i$ is connected to the two elementary emitters of the corresponding pair. Thus, the radiation patterns of each elementary interferometer, which are defined by the relationship (1), are identical, and in particular the maxima coincide, since all the products $L_i f_i$ are equal.

Reception takes place in known manner, by means of a traditional full reception formed for example by a succession of equidistant receiving transducers. The signals of which are delayed and added in order to form reception channels in directions which correspond to those of the maxima of the emission radiation pattern. The receiving transducers are disposed between the two groups of emitters, in order to form a system the space requirement of which in terms of length is a minimum.

As in the case of the interference sonar having two emitters, the full coverage of the angular field may take place either successively by means of emissions which are alternately in phase and in anti-phase on all the elementary emitters forming the interferometer, at the same frequencies, or simultaneously by using two different frequencies which are emitted simultaneously by each one of the pairs of emitters forming the interferometer.

The apparatus described hereinabove with reference to FIG. 2 also enables a compression of pulses to be obtained. In fact, the envelope of the pulse resulting from the algebraic sum of N signals of different pure frequencies separated by $\Delta f = 1/\tau_e$ in a band $B = N\Delta f$, emitted simultaneously, is precisely identical to a brief signal which is a function of (sin NX/sin X) where X is equal to $\pi \Delta f.t$. The maximum is obtained when these signals are all in phase. The compression of pulses is accordingly achieved by emitting in phase, on the various emitters, at the center of the pulse, i.e. for $t = \tau_e/2$ after the commencement of the pulse.

FIG. 3 is the vectorial representation of the compression of pulses for an example in which N=3. As the reference vibration plane passes through the center 0 of the array, the vibrations corresponding to each pair of elementary emitters, for a given direction, add symetrically in relation to this plane. In the case of the directions $\theta$ which correspond to the maxima of the function $F(\theta)$, the resultant vector has a maximum amplitude equal to $V_M$. For any direction $\theta$ whatsoever, the amplitude is equal to $V_P$ and less than $V_M$. FIG. 4 shows schematically the pulses transmitted nn the various pairs of emitters, and the resultant pulse compressed as a function of time; on this figure, N=3 has been selective, as on FIG. 3, for the sake of greater convenience. Let $\omega_1$, and $\omega_0$ and $\omega+1$ be the angular frequencies of the emitted signals: $\omega_i = 2\pi f_i$ and $\tau_i = L_i/2c \sin \theta$.

The products $\omega_i \cdot \tau_i$ are dependent only upon the direction of observation $\theta$ and not upon i, since $L_i f_i = K$. The width, at three decibels, attenuation, of the envelope of the compressed pulse is $\tau_e/N = 1/N\Delta f = 1/B$. The associated processing gain in decibels is equal to 10 log. B. $\tau_e$, i.e. 10 log. N. Accordingly, the emission equipment according to the invention effects a pulse compression on emission in water, and this applies to all the directions $\theta$ of the angular field. The form of the temporal pulse is accordingly not a function of the direction $\theta$, and remains identical to itself in all its directions, with an amplitude factor $F(\theta)$ corresponding to the emission pattern.

In the numerical example indicated hereinabove, in which the angular field is between $-15°$ and $+15°$, and in which the central frequency is $f_o = 200$ KHz, for a sonar intended to provide a visual display of the sea bed, the desired resolution in terms of distance is estimated at 0.2 m, i.e. a frequency aand as indicated hereinabove of $B = 3.75$ KHz. The maximum frequency band $\Delta f_{max}$ relating to a single interferometer being equal to approximately 750 Hz, the emission array of the sonar according to the invention comprises five interferometers, that is to say five pairs of elementary emitters forming these five interferometers. These five pairs of emitters are supplied simultaneously with pulses of durations $\tau_e = 1.33$ milliseconds, at frequencies $F_{-2} = 198.5$ KHz, $F_{-1} = 199.25$ KHz, $F_o = 200$ KHz, $F_1 = 200.75$ KHz and $F_2 = 201.5$ KHz.

The sound emission level obtained by means of such a system of arrays remains of the same order as that obtained by means of a system having two emitters. In fact, a source of length l has a directivity the lob width of which at 3 decibels, attenuation is $\lambda/L$ in radians. In order to obtain an angular field at least equal to $2\theta_0$, the maximum length $L_{max}$ of a single source is $L_{max} = \lambda/2\theta_0$. Moreover, the spacing $e_i$ between the phase centers of two neighbouring emitters in the system according to the invention is given by the following relation: $2e_i = L_i - L_{i+1}$, which is close to $K/c \cdot \Delta f/f_i \cdot \lambda_i (\Delta f/f_i$ being small).

In view of the fact that f is at most equal to $1/(4L\tan\theta_0)$, $e_i$ is approximately $\lambda_i/(8 \tan \theta_0)$. Consequently, the length $L_i$ of the emitters, which is limited to their spacing $e_i$ for an array in respect of which it is desired that all the emitters should be collinear, is approximately four times less than the length $L_{max}$. In consequence of this, with an interferometer comprising at least four pairs of emitters, the sound level emitted is almost equal to that of an interferometer comprising only one pair of emitters, since the emission surfaces are equivalent.

In the numerical example indicated hereinabove, the spacing $e_i$ between two neighbouring emitters is equal to 0.47 $\lambda_i$, i.e. approximately 3.5 mm. The maximum length $L_{max}$ is of the order of 15 mm. In order to obtain a level of emission equal to that of an interferometer having two emitters each of which is 15 mm long, the length of each emitter is fixed at 3 mm. The distance between the two emitters of the central pair is equal to 1.875 m. The figures indicated hereinabove show that, in relation to the traditional intereterometer having two emitters, the resolution in terms of distance has been increased for a fixed angular field, the level of emission remaining equal.

It is likewise possible not to make the elementary emitters collinear, and to impart to the length of each emitter the maximum length $L_{max}$. In this arrangement, the emitters are displaced and superposed, as shown in FIG. 5 in front elevation. In this case, the emission surface is multiplied by five in relation to the emission surface of a traditional interferometer having two emitters.

According to a second embodiment, the resolution in terms of distance of the sonar is fixed at 1 m and the angular field $2\theta_o$ at 90°, i.e. between $-45°$ and $+45°$. If the emission base of the interferometer L is equal to 250 $\lambda$ and if the central emission frequency $f_o$ is equal to 200 KHz, as in the preceding example, $\Delta f_{max}$ is in this case equal to 200 Hz. The minimum band necessary for a sonar is equal to 800 Hz, which requires four interferometers, the pairs of emitters of which are supplied with pulses of duration $\tau_e = 5$ milliseconds, at frequencies $F_{-2} = 199.7$ KHz, $F_{-1} = 199.9$ KHz, $F_1 = 200.1$ KHz, $F_2 = 200.3$ KHz. In this case, there is no emitter which emits precisely at the frequency $F_o = 200$ KHz.

The invention is not limited to the embodiments which have been precisely described and represented. In particular, it is possible to weight the emitted pulse by a weighting circuit, in such a manner that its width at three decibels is of the form $k/N\Delta f$, where k, being greater than 1, depends upon the weighting system selected.

Moreover, in order to reduce the level of the secondary lobes of the directivity resulting from the product of the emission and reception directivities, the distance between the two groups N of emitters may be chosen to be less than the length of the reception array, the signals received by the reception transducers being in these circumstances weighted, as described in the U.S. Pat. No. 4,510,586.

Finally, an additional processing stage involving pulse compression on reception and known per se may be implemented in the interference sonar in order to increase further the processing gain. To this end, the duration $\tau_e$ of the emitted pulses is chosen to be greater than $1/\Delta f_{max}$, and is coded, for example by linear frequency modulation. The signal emerging from a recettion channel is processed in parallel in N subchannels centered on the various emission frequencies $f_i$. Accordingly, each subchannel comprises a band pass filter centered on the frequency $f_i$ and of width $\Delta f_{max}$, followed by a filter tuned to the emitted code, for example to the linear frequency modulation. The signals emerging from the N parallel subchannels are then added. The supplementary processing gain which is obtained in this manner is equal to $\Delta f \cdot \tau_e$.

I claim:

1. A broad band interference sonar transducer array exhibiting compressed emission, comprising an emission system having two spaced emitters associated with emission control circuits and a reception system associated with reception circuits, wherein each emitter is constituted by a group of N pairs of elementary emitters $(E_1)_i$ and $(E_2)_i$, where i is an integer between $-(N-1)/2$ and $(N-1)/2$ for odd N and i is between $-N/2$ and $+N/2$ and different from O for even N, one elementary emitter $(E_1)_i$ being spaced from the corresponding elementary emitter $(E_2)_i$ by a length $L_i$, these two elementary emitters including means for supplying a common signal of frequency $f_i$, wherein the products $L_i f_i$ of the N pairs of elementary emitters defined in this manner are equal, and wherein all the emitters are supplied simultaneously, during recurrent pulses, with signals of frequencies $f_i$ in phase at the center of the pulses.

2. Interference sonar according to claim 1, wherein, the maximum frequency band capable of being covered by means of a single pair of emitters separated by a distance L being $\Delta f_{max} = c/(4 L \tan \theta_o)$ for a given angular field in the range between $-\theta_o$ and $+\theta_o$, and the frequency band to be covered being B centered on the frequency $f_O$, N is the integer greater than the quotient $B/\Delta f_{max}$, where c is the velocity of the sound waves in water.

3. Interference sonar according to claim 2, wherein the pairs of elementary emitters each cover a band $\Delta f = B/N = 1/\tau_e$ simultaneously emitting the signals at frequency $f_i$ during pulses of duration $\tau_e$, $f_i$ being equal to $f_o + i\Delta f$ for odd N and to $f_o + (\text{sign } i)(2|i|-1)/2 \, \Delta f$ for even N.

4. Interference sonar according to claim 1, wherein said supplying means includes means for weighting the pulses of signals at frequencies $f_i$ transmitted to the pairs of emitters $(E_1)_i$, $(E_2)_i$ in accordance with the same predetermined weighting system.

5. Interference sonar according to claim 1, wherein the elementary emitters are collinear, their length being less than one half of the difference between the spacings $L_i$ of two pairs of neighboring elementary emitters.

6. Interference sonar according to claim 1, wherein the elementary emitters are distributed over several displaced lines, their length being equal to the maximum length necessary in order to cover a given angular field.

7. Interference sonar according to claim 1, wherein the two groups of elementary emitters are placed at the extremities of the reception antenna.

8. Interference sonar according to claim 1, wherein the two groups of elementary emitters are spaced by a length less than the length of the reception system, the reception circuits including reception transducers and means for weighting the signals received by the reception transducers.

* * * * *